US012775284B2

(12) United States Patent
Parienti

(10) Patent No.: US 12,775,284 B2
(45) Date of Patent: Oct. 27, 2026

(54) DUAL-MODE AUTOMATIC PUBLIC/PRIVATE TRANSPORT SYSTEM

(71) Applicant: Raoul Parienti, Nice (FR)

(72) Inventor: Raoul Parienti, Nice (FR)

(*) Notice: Subject to any disclaimer, the term of this patent is extended or adjusted under 35 U.S.C. 154(b) by 138 days.

(21) Appl. No.: 18/692,606

(22) PCT Filed: Sep. 15, 2022

(86) PCT No.: PCT/EP2022/075630
§ 371 (c)(1),
(2) Date: Mar. 15, 2024

(87) PCT Pub. No.: WO2023/041636
PCT Pub. Date: Mar. 23, 2023

(65) Prior Publication Data

US 2025/0138551 A1 May 1, 2025

(30) Foreign Application Priority Data

Sep. 15, 2021 (FR) ...................................... 2109702

(51) Int. Cl.
*G05D 1/646* (2024.01)
*G05D 1/698* (2024.01)
(Continued)

(52) U.S. Cl.
CPC ........... *G05D 1/646* (2024.01); *G05D 1/6985* (2024.01); *G08G 1/22* (2013.01); *H04L 9/50* (2022.05); *G05D 2101/10* (2024.01); *G05D 2105/22* (2024.01); *G05D 2109/10* (2024.01); *G05D 2111/10* (2024.01); *G05D 2111/34* (2024.01);
(Continued)

(58) Field of Classification Search
None
See application file for complete search history.

(56) References Cited

U.S. PATENT DOCUMENTS 8,831,800 B2 * 9/2014 Parienti ................ G05D 1/0234 701/19
8,861,790 B2 * 10/2014 Reeves ................ G06V 20/588 382/104
(Continued)

FOREIGN PATENT DOCUMENTS

EP 2310924 A1 4/2011
JP 6492469 B2 * 4/2019

*Primary Examiner* — Redhwan K Mawari
*Assistant Examiner* — Nada Mahyoob Alqaderi
(74) *Attorney, Agent, or Firm* — NIXON & VANDERHYE

(57) ABSTRACT

Automatic private public transport system, comprising a plurality of vehicles, operating by optoguidance along a colored strip, each vehicle incorporating an inertial unit, capable of managing all the parameters associated with the movements of a vehicle, namely: a starting point, the direction, accelerations, durations, as well as all the successive variations of these different parameters, the processing of the aforementioned data enables the on-board computer to calculate and define the vehicle's route and to store it, the said route data reproducing a succession of points on the said route, i.e. a virtual computer image of the colored strip of the route travelled. In this way, the on-board computer uses the virtual computer strip to continue its journey if the colored strip is no longer visible.

14 Claims, 6 Drawing Sheets

(51) Int. Cl.

| | |
|---|---|
| ***G08G 1/00*** | (2006.01) |
| ***H04L 9/00*** | (2022.01) |
| *G05D 101/10* | (2024.01) |
| *G05D 105/22* | (2024.01) |
| *G05D 109/10* | (2024.01) |
| *G05D 111/10* | (2024.01) |
| *G05D 111/30* | (2024.01) |
| *G05D 111/50* | (2024.01) |

(52) U.S. Cl.
CPC ...... *G05D 2111/52* (2024.01); *H04L 2209/84* (2013.01)

(56) References Cited

U.S. PATENT DOCUMENTS

| | | | | |
|---|---|---|---|---|
| 9,014,902 | B1 * | 4/2015 | Murphy ................. | G05D 1/027<br>701/26 |
| 2006/0200280 | A1 * | 9/2006 | Kono ..................... | B62D 1/265<br>701/19 |
| 2011/0125345 | A1 * | 5/2011 | Parienti ................ | G05D 1/0234<br>701/2 |
| 2013/0336537 | A1 * | 12/2013 | Reeves ................ | G01C 21/206<br>382/104 |
| 2022/0284432 | A1 * | 9/2022 | Papantoniou ........ | G01C 21/367 |

* cited by examiner

DUAL-MODE AUTOMATIC PUBLIC/PRIVATE TRANSPORT SYSTEM

CROSS-REFERENCES

This is a U.S. National Application of the International Patent Application PCT/EP2022/075630 filed on Sep. 15, 2022 and claiming priority to FR2109702 filed on Sep. 15, 2021.

TECHNICAL AREA

This invention relates to a private public transport system consisting of a fleet of vehicles, intended to transport one or more passengers, like a private vehicle, from a departure point to a destination point, within a town, a conurbation or in an interurban area.

The aim of the invention is to provide a complementary solution to mass urban public transport, such as bus, metro or tram, whose usefulness is inescapable. Other means of transport have developed, such as bicycles, scooters, self-service vehicles and car-sharing applications, which provide interesting but partial solutions.

Autonomous shuttles have appeared on marked routes, travelling at low speed and stopping at each stop to allow passengers to board and alight. This solution is used on certain well-defined routes, in particular on major roads, but does not allow passengers to travel from any point of departure to any point of destination, in the private and friendly atmosphere of a personal vehicle.

The invention presented in this document remedies all these disadvantages. What's more, it offers a relevant alternative to personal vehicles, which clutter up and pollute our cities and cause recurring and costly parking problems.

The invention described in this document provides a practical, rational, user-friendly, ecological and economical solution and offers a "plus" service. For the user, it's as if everyone had a vehicle with a private driver at all times, at a much lower cost than a personal vehicle, because each vehicle is used by a large number of people every day. What's more, the system offers car-sharing. So the invention offers a real alternative to the personal vehicle that clogs up and pollutes towns and cities.

The system in question is dual-mode, as vehicles have 2 operating modes:

1—Electric and automatic (driverless) in the city, this mode will be used for the vast majority of journeys.

2—Thermal and manual outside the city. As an option, mode 2 for manual driving can be operated in electric mode.

In automatic mode, the front and rear seats face each other. In manual mode, the user drives the vehicle normally, after rotating the driver's seat or the 2 front seats by half a turn. The 2 front seats are designed to perform this rotation function.

STATE OF THE ART

Major developments involving so-called autonomous vehicles have been tested in California since 2009 by a major American group. Ultimately, these vehicles were to operate without a driver. To find their way around, the vehicles mainly used LIDAR (light detection and ranging) systems, which use lasers to detect and estimate distance. This is a device that emits multiple infrared laser beams, which are reflected to generate an image of the environment.

But after covering millions of kilometres in autonomous mode (levels 2 to 3), with a driver behind the wheel who can take control, and investing considerable sums of money, the American group has taken a step backwards. In November 2018, at a press conference, the chairman of the incumbent operator acknowledged that the objective was extremely complex, and announced that the 100% autonomous car (level 5) would never be on the road, and that this objective seemed utopian, even somewhat of a myth.

Other major groups have followed the first Californian operator with similar driverless vehicle objectives, but it has to be said that to date, no level 5 driverless car solution (without steering wheel or pedals) is yet on the market and that the promise of a 100% autonomous vehicle (level 5) remains a promise to this day.

Some experts are predicting the arrival of this type of vehicle in 2030, 2040 or even much later, but many of them remain very cautious about the reality of the future of the 100% autonomous vehicle (level 5). What's more, many experts believe that the eventuality of a fully autonomous personal vehicle would be a real catastrophe for our towns and cities. This eventuality would lead to a huge increase in the number of personal vehicles on the road and parked, generating inextricable traffic jams and suffocating our cities.

The state of the art closest to the invention presented is patent EP 2 310 924 B1. This document describes an essentially urban transport system enabling one or more people to be transported from one point to another by following a coloured strip stuck to the ground, using optoguidance, the said coloured strip (10) incorporating RFID chips (acronym for Radio Frequency Identification) which enable precise location to be determined periodically.

This innovation has one major drawback. If the coloured stripe (10) on the ground is obscured by snow, ice, sand, or for any other reason, the invention becomes inoperative because the coloured stripe is no longer visible, and after a few metres of driving, the vehicle stops. The invention described in the cited document does not incorporate an inertial unit (1), and therefore does not have the means capable of digitising the coloured stripe (10) and following a virtual computer stripe (20) if the coloured stripe (10) is no longer visible.

The invention presented in this document remedies this disadvantage and allows the vehicle (6) to travel in complete safety whatever the weather conditions, with or without the visibility of the coloured strip (10), fixed or painted on the road.

BRIEF DESCRIPTION OF THE INVENTION

The invention consists of a plurality of vehicles capable of transporting one or more people from any point of departure to a chosen destination (door-to-door), without a driver, fully automatically by optoguidance following a coloured strip fixed to the roadway which incorporates RFID or transponder chips. Characterised in that each vehicle incorporates an inertial unit capable of managing all the parameters relating to the vehicle's movements and defining the path of the said vehicle by identifying a succession of points on the path, i.e. a virtual computer image of the coloured strip of the said path. All the data from the journeys made by each vehicle is transmitted to the centralised computer system, which in turn transmits said journey data to all the on-board computers of each vehicle in the fleet. In this way, the said transport system continues to operate normally even if the coloured stripe is no longer visible, by following the virtual computerised coloured stripe.

BRIEF DESCRIPTION OF FIGURES

FIG. 1 also shows the coloured strip (10) incorporating RFID chips (9).

DETAILED DESCRIPTION OF THE INVENTION

Figure 1:
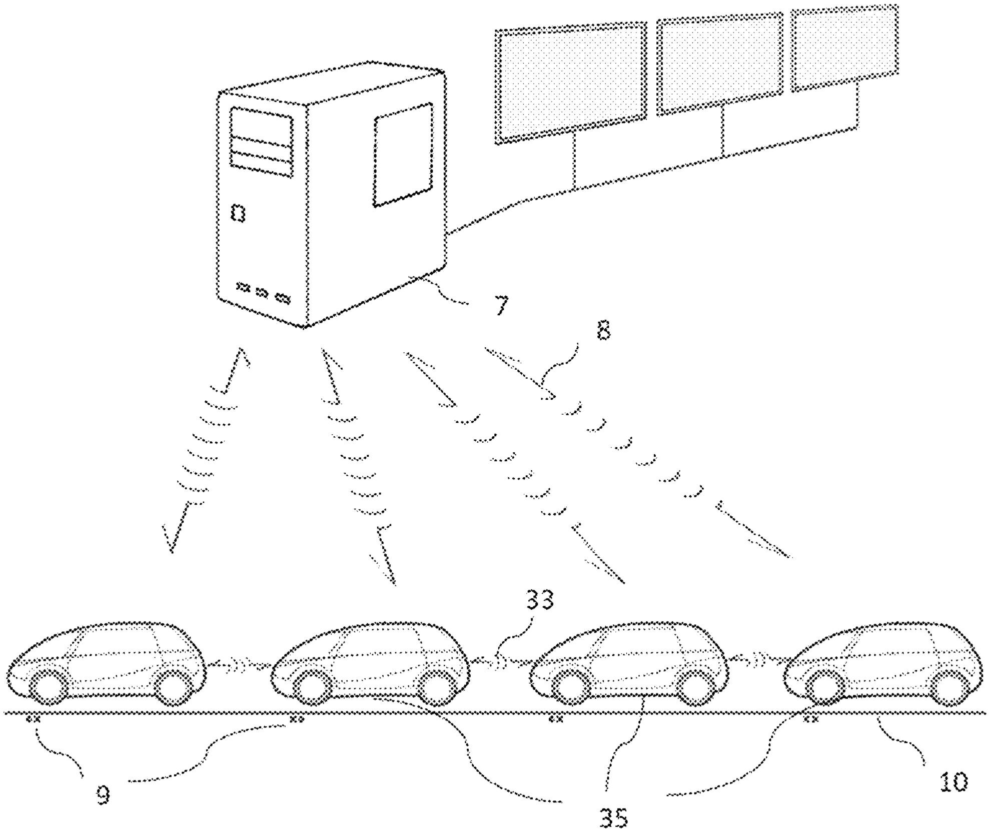
FIG. 1 shows a virtual train (35) of vehicles (6) communicating with each other by means (33), and communicating with the centralised computer system (7) via an encrypted link (8).
Figure 2:
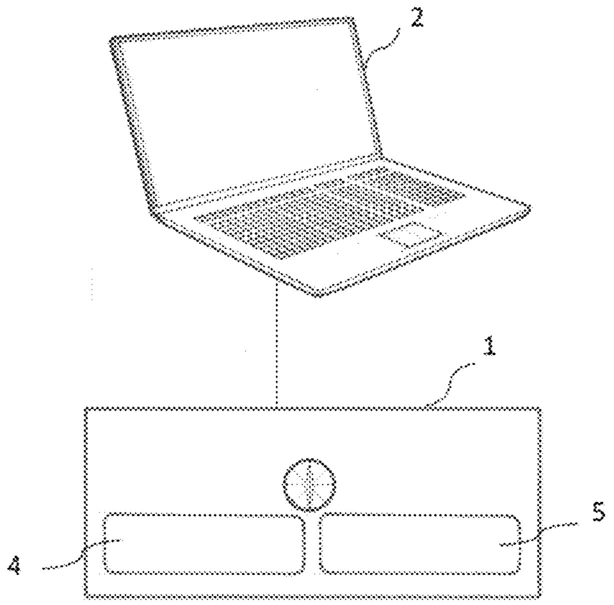
FIG. 2 shows the on-board computer (2) connected to the inertial unit (1), which is equipped with an accelerometer (4), a gyroscope (5) and a compass.
Figure 3:
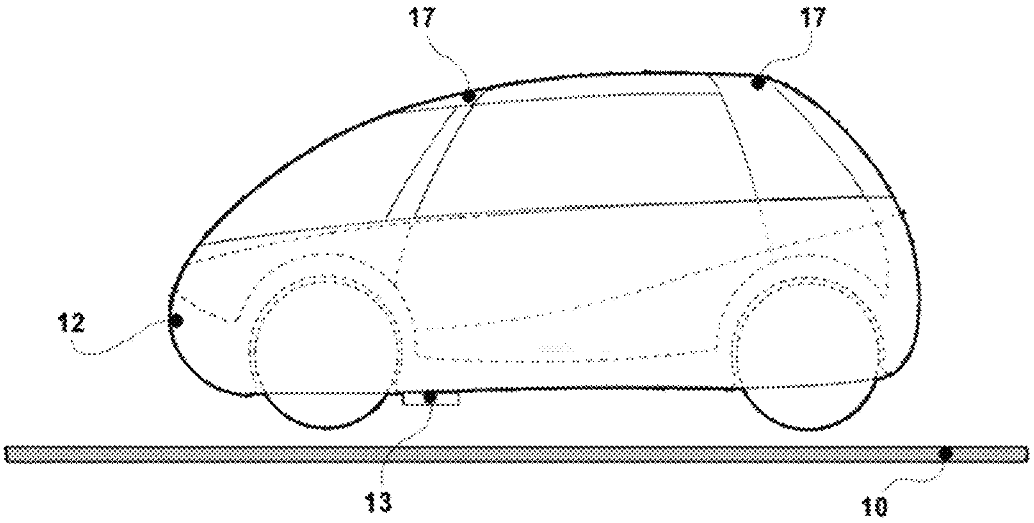
FIG. 3 shows the layout of the camera for tracking the coloured band (10), the cameras (17) and the RFID antenna (13).
Figure 4:
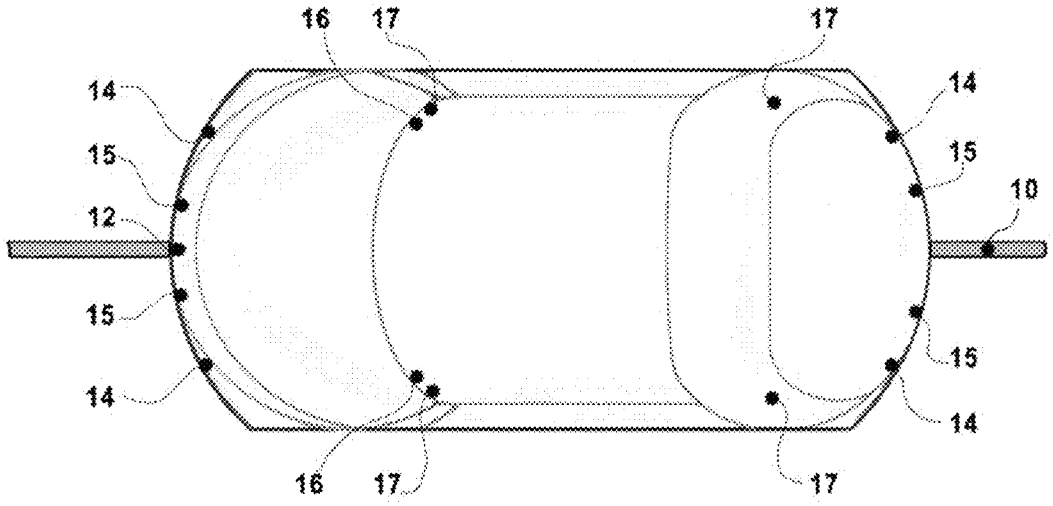
FIG. 4 shows the layout of the camera (12) for monitoring the coloured band (10), the infrared sensors (14), the ultrasonic sensors (15) and the microwave radars (16), as well as the coloured band (10) and the cameras (17).
Figure 5:
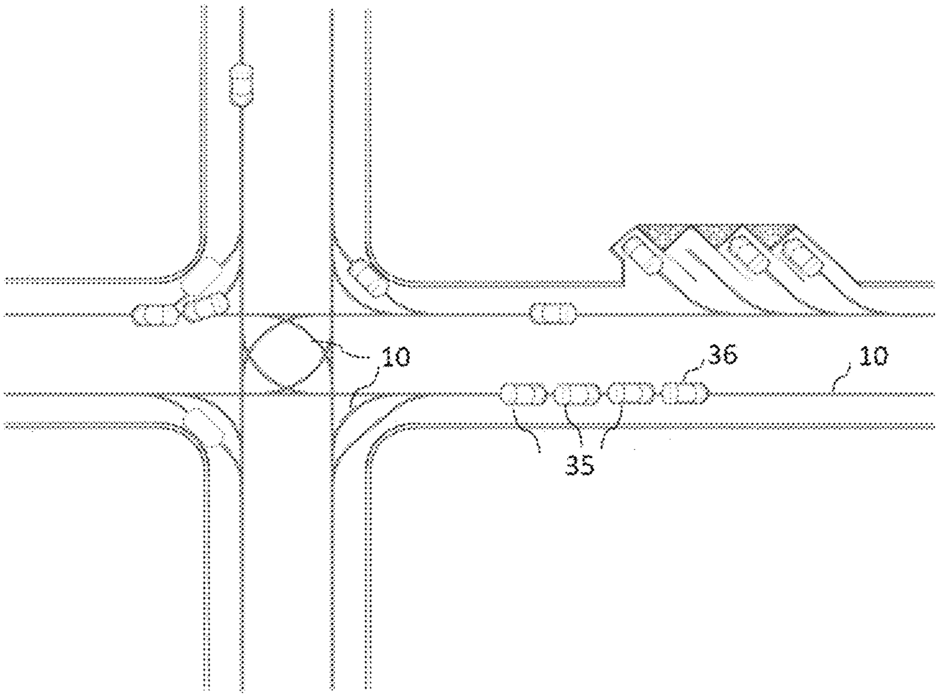
FIG. 5 shows a configuration of coloured stripes (10), in particular at a crossroads, and also shows vehicles stopped at the corners of a crossroads, in particular to pick up or set down passengers, and others parked. We can also see a train of vehicles (35) following a master vehicle (36).
Figure 6:
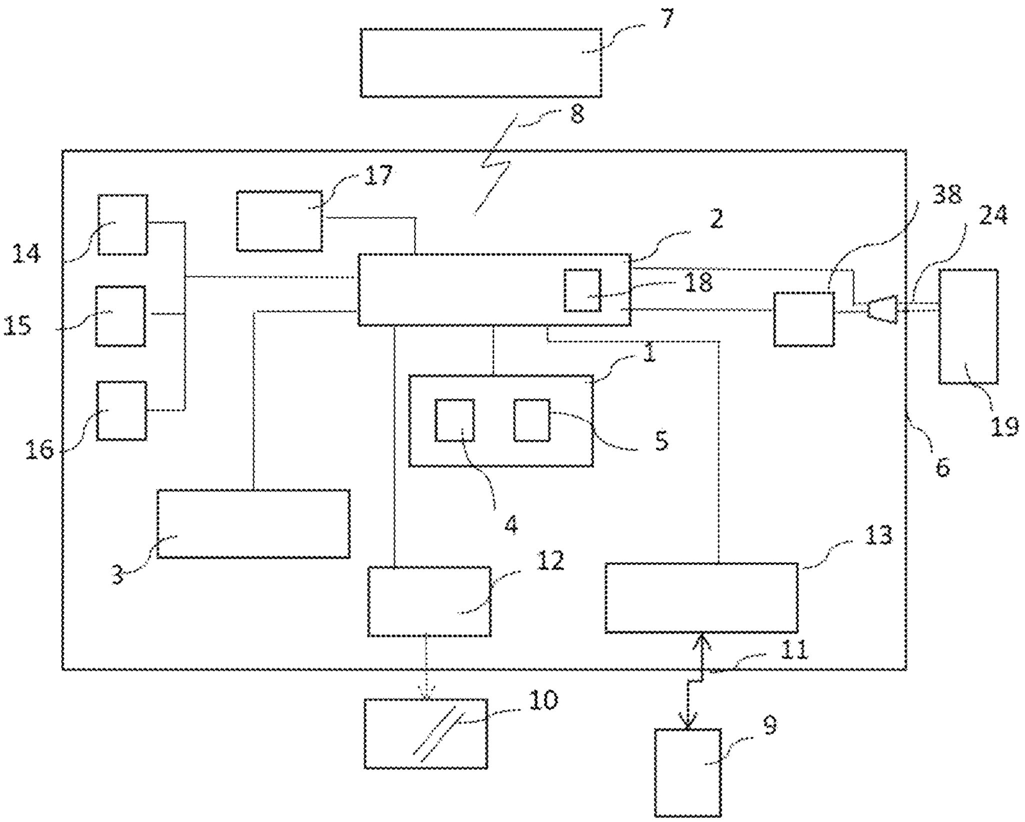
FIG. 6 shows a flowchart of the invention cooperating with remote sub-assemblies: with the centralised computer system (7), via encrypted communication (8); a camera (12) enables the vehicle (6) to follow the coloured strip (10), finally an antenna (13) enables data to be exchanged with the RFID chips (9). The invention works in conjunction with a contact terminal (19) for recharging the vehicle's battery (38) and exchanging route data between the computer (2) and the centralised computer system (7) via a semi-rigid arm (24).
Figure 7:
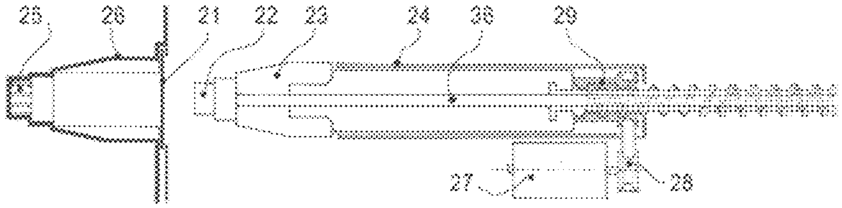
FIG. 7, FIG. 8 and FIG. 9 show the connection device between the recharging and data transfer terminal. A motor (27), acting on a belt and driving the rotation of a nut (29) cooperating with a screw (34), causes the translation of the semi-rigid arm (24) integral with the screw (34), until the male connector (22) is connected to the female connector (25).
Figure 8:
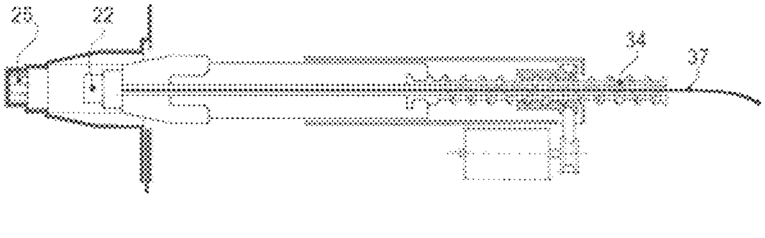
Figure 9:
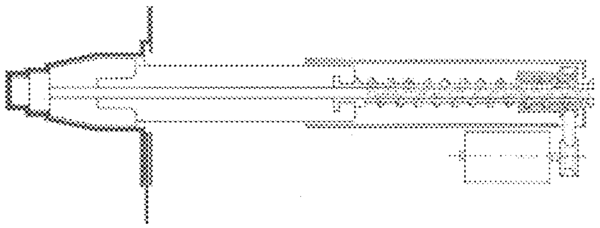
Figure 10:
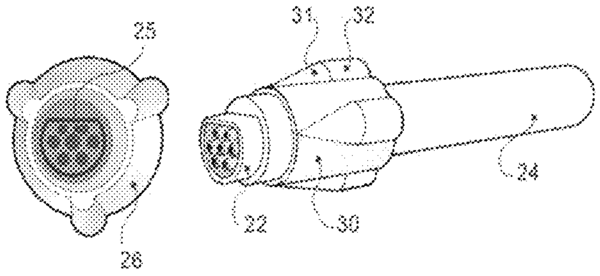
FIG. 10 shows details (30), (31) and (32) for guiding the male connector (22) to the female connector (25).
Figure 11:
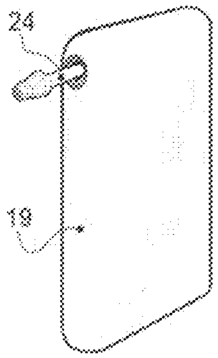
FIG. 11 shows the bollard (19) with the semi-rigid arm (24) extended.
Figure 12:
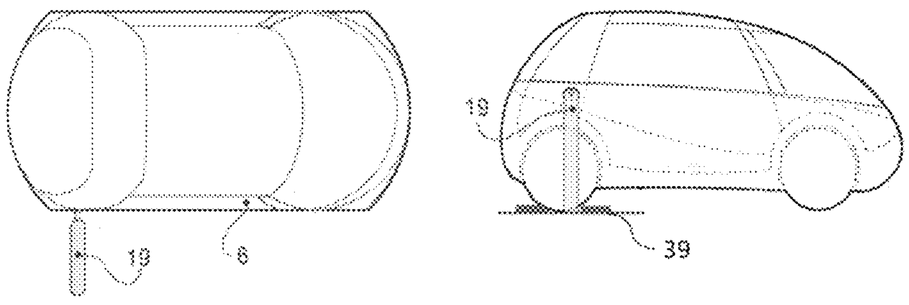
FIG. 12 shows the vehicle (6) connected to the terminal (19) from above and from the side.

What characterises the invention is the fundamental role of the inertial unit (1) connected to an on-board computer (2), storing ad hoc software, said inertial unit being of the MEMS type (acronym for Micro-Electro-Mechanical-System).

One example is the MPU-6050 inertial unit (registered trademark, "MPU" being the acronym for memory protection unit), in combination with a dedicated Arduino board (registered trademark) and suitable servomotors connected to a control unit (3). This control unit is equipped with a three-axis accelerometer (4), a three-axis gyroscope (5) and a compass. Thus, the fundamental element of the invention is the inertial unit (1), which is capable, with the assistance of the computer (2), of digitising the coloured stripes (10) that the vehicle follows by optoguidance, and of generating virtual computer stripes (20), an image of the coloured stripes (10). These virtual computer strips (20) are stored in the memory of the on-board computer (2) and then retransmitted to all the vehicles (6) in accordance with a procedure defined below. The procedures for digitising the coloured strip (10) are described below.

A vehicle (6) moves by following the coloured strip (10) by optoguidance. Once the starting point and initial speed are known, the inertial unit (1) is able to process all the parameters relating to the movement of the vehicle (6), i.e. direction, acceleration, time and all the successive variations in these different parameters. All the above data processing enables the inertial unit (1), assisted by an on-board computer (2), to define all the successive points on the route travelled, thus recreating a virtual computer colour strip (20), an image of the real colour strip (10). Speed is the derivative of the path with respect to time, and acceleration is the derivative of speed with respect to time. Consequently, by solving a double integration, it is possible to define the position of a point at each instant with the same initial constants, i.e. the initial speed and the starting point, as seen above. In our case, these constants are identified. As explained below, the point of departure is the point at which the passenger(s) are picked up, which is perfectly identified thanks to the precise coordinates (x, y, z) of the RFID chips (9), refined by odometry (distance travelled per number of wheel revolutions), and the initial speed is zero, as it corresponds to the moment at which the passenger(s) are picked up. The data supplied by the inertial unit connected to the on-board computer (2), fitted with a suitable electronic card and ad hoc software, can be used to identify a series of points along the route. To be more precise; the concatenation of the consecutive segments defined by the successive points of the route identified by the inertial unit (1) will define a virtual computer image (20) of the coloured strip (10) of the route travelled.

In this way, if the coloured stripe (10) is not visible for atmospheric reasons, snow, ice, sand, malevolence or any other reason, the vehicle can continue the programmed route normally, following the virtual computer stripe (20).

The on-board computer (2) and the centralised IT system (7) are equipped with an expert system which stores all information relating to journeys made in order to integrate the experience acquired during use. The expert system applies decision logic to select the appropriate course of action based on stored journey data. In reality, the fact that the vehicle follows a coloured strip (10) by optoguidance or by following the virtual computer strip (20) considerably reduces the role of the expert system, which will be used to respond to marginal and/or extreme cases.

It is preferable to multiply the number of inertial units (1), operating simultaneously so that the on-board computer (2) can check the consistency of the data supplied by each of the said inertial units (1), in combination with the AI, which store "decision theory" algorithms, so that the AI can make the best decision in every conceivable situation. This redundancy ensures a high level of system reliability.

For example, if three inertial sensors are operating simultaneously, the "decision making" algorithm can be programmed so that at least two of them determine the same path, in order to validate said path.

When the vehicle goes to recharge at a specific recharging station (19), described later, all the data on the journeys made by each vehicle is transmitted to the centralised computer system (7), then the said centralised computer system (7), in turn, retransmits all the said data corresponding to the journeys made by each vehicle to all the vehicles (6) in the fleet, via the recharging station (19). It should be noted that the data on the journeys made constitute the data on the virtual computer strips (20), the digitised coloured strips (10).

In this way, all the vehicles will receive and store all the virtual computer images (20) of all the journeys made by all the vehicles. To avoid an overload of unnecessary data transfers, the centralised computer system (7) distributes to each vehicle the virtual computer images (20) of journeys not already stored in the memory of the on-board computer (2) of that vehicle.

According to an embodiment of the invention, when the vehicle (6) is moving, the inertial unit (1) associated with the on-board computer will use to analyse all the parameters relating to movement, as described above: starting point, speed, acceleration, direction, time, as described above, and will identify the points of any journey every 100 milliseconds. For example, if the vehicle is travelling at 36 km/h, covering 10 metres per second, every 100 milliseconds the vehicle will cover one metre. So, between two consecutive points as defined above, the length of the segment is one metre.

According to a more sophisticated method, the frequency of identification of the points on the route by the inertial unit (1) will be adjusted in relation to the speed so that the distance between two consecutive points on any segment of the route is the same length. For example, if the vehicle (6) is travelling at 18 km/h, covering five metres per second, then the points on the route will be identified every 200 milliseconds. The length of the segments defined between two consecutive points will therefore also be one metre.

In this way, the inertial unit will identify the points of the paths at regular or variable time intervals, whose concatenation of the consecutive segments defined by the successive points of the path identified by the inertial unit (1), as seen above, will define a virtual computer image (20) of the coloured band (10) of the said path travelled.

Each RFID chip stores a unique identifying code (11), with each unique identifying code corresponding to the precise coordinates (x, y, z) of said RFID chip, stored in the on-board computer (2) of any vehicle (6). Whenever the computer (2) of the vehicle (6) detects a drift in relation to the precise location provided by the RFID chip integrated on the coloured strip (10), a correction is made to the trajectory thanks to the action of the steering via the control unit (3), and the inertial unit is recalibrated on the precise coordinates provided by the RFID chip.

For security reasons and to prevent any falsification, the virtual tape (20) resulting from the concatenation of the segments of the path, i.e. the software reconstruction of the path, is certified by a blockchain because each of the segments making it up is itself certified by the said blockchain. The blockchain is a certified, unalterable database with a high level of security, operating without a central control body, but with distributed control over several servers that continuously and mutually control each other in accordance with the specific function of the blockchain, which makes any falsification impossible. In fact, every segment added is subject to a cryptographic transaction check verified by all these servers. In this way, every path is a (possibly hierarchical) history of the addition of elementary segments, which is subject to a permanent check on the validity of its existence.

Each vehicle has an on-board computer (2) connected to a centralised computer system (7), and all communications (8) between the on-board computer and the centralised computer system are encrypted and secure.

However, if necessary, the vehicle can be driven remotely by a remote operator using a driving simulator-type device with all the controls of a vehicle and via the images transmitted by the cameras (17) built into the vehicle. Exchanges between the operator and the vehicle for control by an operator take place via encrypted communication (8) between the centralised computer system (7) and the on-board computer (2). This communication can also take place via an encrypted 5G (fifth generation acronym) link.

The computer system and the on-board computer, combined with the AI, memorise the mapping of the entire network of coloured stripes (10), the Highway Code, the recognition of traffic lights and their position, and all the road signs. The AI interprets all types of situation and reacts accordingly, always giving priority to safety. The vehicle automatically adapts its speed and movement according to road signs, speed limit zones and potential danger zones stored in the onboard computer memory (2) (schools, level crossings, etc.) or instructions received in real time from the centralised computer system (7) via encrypted communication (8).

Each RFID chip (9), or transponder, is integrated by coring into the coloured strip (10) fixed to the roadway and stores a unique identification code (11). Each unique code (11) of each RFID chip is associated with the coordinates (x, y, z) of said RFID chip, said coordinates being stored in the on-board computer of all the vehicles (6). In this way, the position of the vehicle can be defined at any time using the coordinates of each RFID chip (9) crossed by the vehicle. Between two RFID chips, the vehicle's position is refined and defined to within a few centimetres by odometry (distance travelled by the number of wheel revolutions made by the vehicle).

Each vehicle includes means for locating and tracking the coloured stripe by means of at least one camera (12), the image of which is processed by the on-board computer and acts on a steering servo-control device connected to a control unit (3), in order to ensure precise tracking of the coloured stripe (10).

The control unit (3) acts on instructions from the on-board computer (2) to provide all the commands needed to keep the vehicle moving, including steering, braking, accelerating, slowing down, sounding the horn, flashing the indicators, changing lanes and activating the hazard warning lights.

This coloured strip (10) can be made of a polymer heat-bonded to the road and coloured throughout, or of a simple strip of low-cost paint. The latter option enables all the streets in a built-up area, as well as related roads and paths, to be equipped very quickly. This strip (10) can be continuous or discontinuous depending on the area concerned.

The said coloured strip incorporates RFID chips (9) or transponders, and each vehicle (6) comprises means of reading the said RFID chips. Whenever the on-board computer (2) detects a drift in relation to the precise location provided by an RFID chip (9) integrated into the coloured strip (10), a correction is made to the trajectory by the action of the steering via the control unit (3), and the inertial unit (1) is recalibrated to the precise coordinates provided by the RFID chip.

These coordinates (x, y, z), stored in the RFID chips, are adaptable to all geodetic reference frames.

The coloured strip (10) has a constant specific colour, preferably blue, to differentiate it from conventional road marking strips while blending in well with the urban landscape.

Each vehicle is equipped with means for detecting the RFID chips (9) embedded in the coloured strip. To do this, each vehicle is fitted with a suitable antenna (13) for reading the unique code (11) stored in the said RFID chip (9). To do this, a suitable radio frequency signal is transmitted by the antenna (13) to the RFID chips or transponder, in order to receive in return the unique identification code (11) of each RFID chip integrated in the coloured strip (10), travelled by the vehicle.

Each vehicle is equipped with several cameras (17), located at several strategic points of the vehicle and in particular at the 4 high points of the passenger compartment, so as to be able to cover a 360 degree field, enabling the on-board computer (2) to have a permanent view of the vehicle's environment and to be able to record a video of any movement for control and safety purposes, in particular in the event of incidents or accidents. Of course, these recordings are periodically erased and only used when necessary.

Each vehicle is fitted with a set of sensors of several types:

Infrared sensors (14) to determine whether a pedestrian or cyclist is nearby. These sensors are located at several points around the vehicle.

Ultrasound (15), to determine whether another vehicle is approaching, or is not respecting the safety distance, which can then trigger a signal such as the hazard warning light, via the on-board computer (2), connected to the sensor and the control unit (3). These sensors are located on at least four sides of the vehicle: front, rear and both sides.

Radar (16), (microwave). These sensors have a range of several hundred metres in direct vision. They use the echo of a vehicle to determine its direction and speed in order to anticipate the appropriate action determined by the AI. These sensors are mainly oriented towards the front of the vehicle.

To sum up, the invention essentially consists of an automatic private public transport system, managed by a centralised computer system (7) comprising a plurality of vehicles (6), means for recharging said vehicles, each vehicle (6) being provided with an on-board computer (2) storing ad hoc software, and communication means, in particular for communicating with the centralised computer system (7), each vehicle being provided with a set of safety sensors. To move, the vehicle (6) will follow a coloured strip (10), by optoguidance, to its destination, said coloured strip incorporates RFID chips (9) or transponders, each vehicle comprises means of reading said RFID chips, characterised in that an inertial unit (1) is capable of managing all the parameters linked to the movements of a vehicle, namely: a starting point, a direction, accelerations, durations, as well as the successive variations of these different parameters, the processing of the aforementioned data enables the inertial unit (1), assisted by an on-board computer (2), to calculate and define a succession of points on the vehicle's path, the concatenation of the consecutive segments defined by the successive points on the path identified by the inertial unit (1), will define a virtual computer image (20) of the coloured band (10) of the said route travelled, the on-board computer (2) will store the said virtual computer images (20), so that in the event of the coloured band (10) no longer being visible, the on-board computer (2) will use the virtual computer band (20) to continue the programmed route normally.

In order to optimise the autonomous vehicle system, the said system has a set of automatic recharging and data transfer terminals (19). These terminals are judiciously distributed throughout the area.

When the vehicle (6) recharges its battery (18) at a recharging station (19), all the data for the journeys made by each vehicle, reproducing the virtual computer images (20) of the coloured strip (10) of the journeys made, is transmitted to the centralised computer system (7), and then the centralised computer system (7) in turn retransmits all the said data corresponding to the journeys made by each vehicle to all the vehicles (6) in the fleet, via the recharging terminal (19), so that all the vehicles receive and store the virtual computer images (20) of the coloured strip (10) of all the journeys made by all the vehicles.

The recharging device consists of terminals (19) fixed to the ground. It includes electronics capable of communicating with the nearby vehicle, managing the recharging of the vehicle's batteries and transferring the route data defined by the computer (2).

Thanks to optoguidance and a wheel chock (39), the vehicle (6) is able to position itself exactly in front of the bollard (19) with a margin of error of less than 10 millimetres.

The vehicle's on-board computer (2) communicates with the electronics of the terminal (19) to trigger mechanical coupling between the terminal (19) and the vehicle (6).

Initially, a mechanical device frees access to the female plug (25) by moving the protective flap (21). The coupling device consists essentially of a male plug (22), a guide device (23), a semi-rigid mobile arm (24) sliding in a cylindrical guide tube and means for actuating the device to connect the mobile male plug (22) with the fixed female plug (25) located at the bottom of a female guide (26).

The device for operating the semi-rigid mobile arm (24) consists of an electric motor (27), the shaft of which is fitted with a pulley (28). This pulley drives a nut (29) via a belt cooperating with a second pulley integral with the nut. Rotation of the motor (27) causes rotation of the nut (29), and said rotation of the nut causes translation of the screw (34) which is integral with the semi-rigid connector arm (24), said arm thus being driven towards the female guide (26).

The male guide consists of a cylindrical part (30) on which three half-cone-shaped guides (31) are fixed on the front part, becoming half-cylinders (32) on the rear part. In this way, the male guide cooperates with the corresponding female guide (26), which is provided with ad hoc grooves to accommodate the half-cone-shaped guides (31), which become half-cylinders (32), as seen above.

The arm (24) is made of a semi-rigid polymer or composite material, capable of a certain flexibility in order to allow a positioning error tolerance between the vehicle (6) and the terminal (19) of a few millimetres to allow perfect coupling between the male plug (22) and the female plug (25), thanks to the cooperation of the male guide (30), and associated guides (31), (32), with the female guide (26). The central part of the semi-rigid arm (24) comprises a recess (36) which receives a sheath (37) containing conducting wires. The wires carry high currents for recharging the battery and low currents for data exchange.

Immediately after connection, initially only the data, essentially linked to the journeys, i.e. the images on the virtual computer tapes (20), are exchanged between the on-board computer (2) and the centralised computer system (7). Data is exchanged between the terminal (19) and the vehicle computer (2) by contact. The data received by the terminal is then stored in a dedicated memory in the terminal and transmitted to the centralised computer system (7). For security reasons, a wired connection is preferred, or a fibre optic connection for high data rates. An encrypted 5 G connection could also be envisaged, but with a lower level of security.

In a second stage, after the data exchanges described above, the high currents for recharging the batteries (18) are activated.

The vehicle (6) is equipped with a second conventional recharging socket so that it can be recharged at a conventional recharging point if required but is unable to transfer journey data to the central computer.

Engine:

Typically, an electric wheel motor will be fitted to each of the rear wheels, each delivering between 10 and 15 kW, for moderate speeds of around 35 to 45 km/h in automatic mode in town. Higher speeds of around 70 km/h will be permitted on fast lanes where there are no junctions. The useful power of an electric vehicle evolves approximately as the cube of its speed. Rolling resistance is linear and aerodynamic resistance evolves with the square of the speed, which means that the capacity in KW/H of the on-board batteries is reduced by a factor of around three, i.e. around 20 kW/H compared with a 100% electric vehicle with a range of around 200 km. At present, the cost of the batteries in an electric vehicle represents around a third of the total cost of the vehicle.

An internal combustion engine will be fitted at the front to provide front-wheel drive. An engine with sufficient power (90 to 100 bhp) will be chosen, capable of cruising at the maximum authorised speed (generally 130 km/h) on motorways and equally agile on mountain roads, with a low level of carbon emissions for the sake of the environment.

The vehicle is designed for shared use, to minimise the number of vehicles on the road and reduce congestion and pollution. When a user books a vehicle using his or her mobile phone, indicating his or her point of departure and point of arrival, the computer (2) communicates with the centralised computer system (7) and searches for another user whose journey is compatible. If this is the case, the vehicle stops on the route to pick up the second passenger.

The vehicle is comfortable and attractive, designed to accommodate four or five people, with a spacious luggage compartment so you can take your family on holiday in manual mode.

This internal combustion engine will be compatible with ethanol, which costs around half as much as petrol. Ethanol is made up of 85% non-fossil fuel, making it more environmentally friendly. When used in internal combustion mode, it recharges the batteries. In electric mode, deceleration or braking recovers kinetic energy to recharge the batteries. An initial statistical estimate shows that more than 90% of journeys will be made in electric mode, which is silent and clean. The invention is designed to evolve towards the probable hydrogen fuel of the future, offering a 100% clean vehicle.

An important feature of the invention is that the vehicles are designed to operate in a virtual train mode (35), to which end the vehicles communicate with each other using secure link vectors (33), namely a digital microwave link combined with an infrared link when the vehicles are at short range.

When the vehicles are organised into a virtual train by following the coloured strip (10) or the corresponding virtual computer strip (20), the lead vehicle becomes the master vehicle and stores in its on-board computer (2) all the destinations of each vehicle and will orchestrate, via the secure link (33), acceleration, braking, obstacle avoidance, and in particular the change of direction of one or more vehicles in a train, by ordering the vehicle immediately following the vehicle(s) changing direction to slow down in order to allow the vehicle(s) to change lane safely to join another coloured strip (10) or the corresponding virtual computer strip (20). According to the normative aspects, the invention has the advantage of being able to be assimilated to a modular tram because the coloured strip fulfils the function of a rail.

The invention can also be used to create a means of intercity transport, thanks to the combination of the inertial unit (1), the coloured strip (10) and the RFID chips (9).

For this purpose, outside built-up areas, on long journeys, the RFID chips (9) are spaced much further apart, from 100 m to 1,000 m. These RFID chips (9) are then integrated into short but clearly visible sections of coloured stripe (10), for example three metres long every 100, 500 or 1,000 metres depending on the configuration of the road (junctions, road changes, roundabouts).

To obtain a virtual computer image of the route, a skilled driver will drive a vehicle (6) in manual driving mode through the routes described above just once, on the part of the road where the coloured stripe would have been placed, paying close attention, each time it sees a portion of coloured stripe, it will drive precisely over the said portion of coloured stripe (10) so that the coordinates (x, y, z) deduced from the identifier (11) of the RFID chip (9) passed by the vehicle (6) accurately recalibrate the inertial unit. In this way, the inertial unit (1) reconstitutes the virtual computer strip (20) of each route travelled. It should be noted that the drift of a basic inertial unit (1), allowing 16-bit precision, is small, and represents a few centimetres over a journey of 1,000 metres, which generally takes between one and two minutes.

In this way, when a skilled driver drives a vehicle (6) precisely once over a discontinuous coloured band (10), the coloured band portions (10) of which are spaced apart, and each of the said coloured band portions incorporates an RFID chip (9), the inertial unit (1) will reconstruct a continuous virtual coloured band (20) of the route taken and will realign the inertial unit with the coordinates (x, y, z) of any RFID chip (9) crossed by the vehicle.

For the system to function correctly, when work is carried out in the conurbation equipped with the invention, the manager of the conurbation concerned communicates to the centralised computer system (7) the elements likely to have an impact on the operation of the invention, which computer system (7) communicates the said elements of the work to the on-board computer (2) of each vehicle, which will take the information received into consideration.

Digitisation of the coloured bands can be carried out by any type of vehicle or robot equipped with an inertial unit (1) and suitable computing resources, and falls within the scope of the present invention.

The implementation of a fine geopositioning network, much more precise than GPS (Global Positioning System), which can be used by any type of operator or application, particularly in the field of transport, autonomous shuttles or any type of vehicle. An authorised operator, equipped with an RFID antenna (13) capable of reading the unique identifier (11) of the RFID chips (13), and cooperating with a computer which memorises the correspondence between the unique code (11) of each chip and its coordinates (x, y, z), provides the operator with a fine and reliable geopositioning network.

All variants of the invention, relating to shapes, colours, materials, arrangements, sub-assemblies and functional elements, remain within the scope of the invention.

CONCLUSION

The invention described in this document is likely to generate a new paradigm in the world of mobility. This innovation combines a number of advantages:

- The great simplicity of the invention, and therefore its reliability, compared with the 100% autonomous vehicle (expected for more than 12 years) which has to find its way at every moment, whereas in the present invention the vehicle follows a coloured strip on the ground using optoguidance or a virtual computer strip.
- Innovation can drastically reduce the problems of congestion, parking and pollution in the city.
- A study carried out by a transport manufacturer and a fleet manager has shown that each vehicle covered by the invention that is deployed in a town will eventually eliminate the need for eight private vehicles, resulting in a significant increase in traffic flow.
- The present invention is effectively resistant to piracy because it does not depend on the centralised computer system. Once the point of departure and the point of arrival have been identified, the vehicle finds its way on its own thanks to the on-board electronics.
- The invention does not depend on a satellite positioning system, so the vehicle can travel under tunnels or underground as well as in the open air.
- The coloured line on the ground clearly indicates where vehicles are passing, for added safety when an autonomous vehicle could appear from any direction. In addition, it will be possible to fine vehicles that park on the strip to avoid blocking traffic.
- The acceptability of the invention is much higher than that of the 100% autonomous vehicle: 76% compared with 14%. That's a ratio of more than five to one.
- The innovation must fit in with the tram standard (because the vehicle follows a virtual track), which will make it much easier to obtain insurance cover.
- The low cost to the user means that a significant proportion of the population in towns and cities use their own vehicles.
- The invention's low cost of installation and operation makes it an attractive investment for the players involved, and for the nation as a whole, which will lead to widespread deployment in many areas, ensuring the invention's long-term future.
- This innovation means that people can still enjoy driving outside the city if they wish,
- Finally, the invention will offer a new quality of life, and a strong boost to economic activity and leisure in the city, while respecting the planet.

The invention claimed is:

1. An automatic private public transport system comprising:

a plurality of vehicles, each of the vehicles being provided with an on-board computer connected to a computer system, the on-board computer and the computer system exchanging communications, each of the vehicles being further provided with a set of safety sensors, the vehicles being configured to follow at least one colored strip by opto-guidance, said at least one colored strip incorporating RFID chips or transponders, each of the vehicles comprising an antenna configured to exchange with said RFID chips; and a recharging terminal configured to recharge the vehicles, wherein, when each of the vehicles follows the at least one colored strip by opto-guidance, at least one inertial unit, equipped with a three-axis accelerometer, a three-axis gyroscope, and a compass, is configured to process data received by the inertial unit with assistance from the computer, provided with a calculator dedicated to the at least one inertial unit and software, the data processed by the at least one inertial unit including parameters of respective movements of each of the vehicles, the parameters including a starting point, an initial speed, a direction, accelerations, durations, and all successive variations of said parameters, processing of the data enabling the inertial unit equipped with the calculator and assisted by the on-board computer, to calculate and define a succession of points on a respective route of each of the vehicles, a concatenation of segments defined by consecutive points of a path identified by the at least one inertial unit defining a virtual computer strip of the colored strip that is a digitization of the path travelled, the data of which is stored in a memory of the on-board computer, enabling each of the vehicles to continue the path by following the virtual computer strip in a case in which the colored strip is no longer visible.

2. The automatic private public transport system according to claim 1, wherein, when each of the vehicles recharges its respective battery at a recharging station, all the data on journeys made by each of the vehicles, reproducing the virtual computer images of the colored strip of the journeys made, is transmitted to the computer system, then the computer system retransmits all said data corresponding to the journeys of each of the vehicles to all the vehicles via the recharging point.

3. The automatic private public transport system according to claim 1, wherein a frequency of identification of the points on the route by the inertial unit is calculated in relation to vehicle speed, so that the distance between two consecutive points on any segment of the path is the same length.

4. The automatic private public transport system according to claim 1, wherein the virtual computer strip resulting from the concatenation of the segments of the journey is certified by a block chain, since each of the segments which constitutes the journey is certified by said blockchain, and every one of the segments added is subject to a cryptographic transaction check, verified by a set of servers.

5. The automatic private public transport system according to claim 1, wherein, whenever each of the vehicles, identified by the on-board computer, drifts from a precise location provided by the RFID chip integrated into the colored strip, the on-board computer triggers an action on a controller, which acts on a steering device to make a correction, then the on-board computer sets the inertial unit to precise coordinates provided by the RFID chip.

6. The automatic private collective transport system according to claim 1, wherein a unique identifying code is stored in a memory of each RFID chip, each of the unique identifying codes of each of the RFID chips corresponding to the precise coordinates of said respective RFID chip, the coordinates of all the RFID chips being stored in the on-board computer of the vehicles.

7. The automatic private collective transport system according to claim 1, wherein, when the vehicles organize themselves in a train of vehicles, following the colored strip or the corresponding virtual computer strip, a lead vehicle of the train of vehicles stores in the respective on-board computer all the destinations of each of the vehicles, via a secure link, said lead vehicle coordinates, via the same secure link, accelerations, braking, obstacle avoidance, and direction changes of one or more vehicles of the train of vehicles, and causes one or more of the vehicles immediately following the lead vehicle or other vehicles in the train of vehicles to slow down and change direction, in order to allow the vehicle or the other vehicles to change lanes to join another colored strip or the corresponding virtual computer strip.

8. The automatic private public transport system according to claim 1, wherein, in outside built-up areas, the RFID chips are spaced every 100 to 1000 meters apart and are fixed to short but clearly visible colored discontinuous strips, so that an authorized driver driving on said colored discontinuous strip causes the inertial unit to reconstitute the virtual computer strip of the route taken and to set the inertial unit back to the coordinates of any of the RFID chips crossed by the vehicle, thereby reconstituting the virtual computer strip of the route taken.

9. The automatic private public transport system according to claim 1, wherein the on-board computer and the computer system are provided with an expert system enabling storing all the information relating to the journeys in order to incorporate experience acquired during use.

10. The automatic private public transport system according to claim 1, wherein the at least one inertial unit comprises a plurality of inertial units operating simultaneously and a coherence of the data supplied by each of said inertial units is monitored by the on-board computer in order to obtain a high level of reliability.

11. The automatic private public transport system according to claim 1, wherein the at least one colored strip comprises a network of colored strips on the roadway, each of the colored strips being provided with respective RFID chips configured to provide geo-positioning and being used by an operator or transport application having an RFID antenna cooperating with a computer configured to read any unique identifier of the RFID chips, and determine its coordinates.

12. The automatic private public transport system according to claim 1, wherein the inertial unit in combination with the computer provided with the calculator and adapted servomotors, connected to a controller acting on a steering system of the vehicle enables the vehicle to continue the route, following the virtual computer strip stored in the memory of the computer, in a case in which the colored strip is not visible.

13. The automatic private public transport system according to claim 1, wherein said system is dual-mode including one of an electric and automatic mode of operation, and a thermal and manual driving mode of operation, in the thermal and manual driving mode, front seats of the vehicles of the automatic public transport system are in the manual driving mode, said front seats being configured to perform a rotating function.

14. An automatic private public transport system comprising:

a plurality of vehicles, each of the vehicles being provided with an on-board computer connected to a computer system, the on-board computer and the computer system exchanging communications, each of the vehicles being further provided with a set of safety sensors, each of the vehicles being configured to follow a colored strip by opto-guidance, said colored strip incorporating RFID chips or transponders, each of the vehicles comprising an antenna configured to exchange with said RFID chips; and a recharging terminal configured to recharge the vehicles, wherein, when each of the vehicles follows the colored strip by opto-guidance, an inertial unit, equipped with a three-axis accelerometer, a three-axis gyroscope, and a compass, is configured to process data received by the inertial unit with assistance from the computer, provided with a calculator dedicated to the inertial unit and software, the data processed by the inertial unit including comprising parameters of respective movements of each of the vehicles, the parameters including a starting point, an initial speed, a direction, accelerations, durations, and all successive variations of said parameters, processing of the data enabling the inertial unit equipped with the computer and assisted by the on-board computer to calculate and define a succession of points on a respective route of each of the vehicles, a concatenation of the segments defined by consecutive points of a path identified by the inertial unit defining a virtual computer strip of the colored strip that is a digitization of the path travelled, the data of which is stored in a memory of the on-board computer, enabling each of the vehicles to continue the path by following the virtual computer strip in a case in which the colored strip is no longer visible, wherein, when each of the vehicles recharges its battery at a recharging station, all the data on journeys made by each of the vehicles, reproducing the virtual computer strips, is transmitted to the computer system, then the computer system retransmits all said data corresponding to the journeys of each of the vehicles to all the vehicles via the recharging terminal, wherein, when recharging each of the vehicle at a specific recharging terminal, opto-guidance and a wheel chock enable said vehicle to be positioned accurately in front of the recharging terminal, the coupling device consists essentially of a male plug, a guide device, and a semi-rigid mobile arm, an actuation device configured to actuate the arm consisting of an electric motor the shaft of which is fitted with a pulley driving a nut via a belt cooperating with a second pulley integral with the nut, the rotation of the motor causing the rotation of the nut, said rotation of the nut causing a translation of a screw which is integral with the arm that is driven towards a female plug, the male plug comprising a cylindrical part on which at least three guides are fixed, the male plug cooperating with the corresponding female plug provided with grooves receiving the male and female plugs, once the male and female plugs have been connected, the journey data is first transmitted to the computer system via a wired or fiber optic link, and then batteries are recharged.

* * * * *